UNITED STATES PATENT OFFICE.

JAMES A. HENRY, OF NEW YORK, N. Y.

COMPOSITION OF MATTER FOR COATING GILDED SURFACES.

No. 843,812.

Specification of Letters Patent.

Patented Feb. 12, 1907.

Application filed April 28, 1906. Serial No. 314,241.

*To all whom it may concern:*

Be it known that I, JAMES A. HENRY, a citizen of the United States, and resident of New York, county of New York, and State of New York, have invented certain new and useful Improvements in Composition of Matter for Coating Gilded Surfaces, of which the following is a specification.

This invention relates to that class of compositions of matter which are used as coatings for gilded surfaces to impart a dull finish thereto, as picture-frame moldings. The composition may be used over either matgold leaf (water-gilding) or oil-gold leaf, the object being to produce the dull or ground gold finish termed "ormolu."

My composition consists of the following ingredients, combined in the proportions stated, viz: white glue, five ounces; gelatin, one and one-half ounces; refined bleached white shellac, four and one-half ounces; gum-mastic, one-half ounce; gum-benzoin, one-half ounce; stick lac, forty grains; pulverized white arsenic, fifteen grains.

In the process of amalgamating the composition the glue and the gelatin are placed in a stone vessel containing two quarts of water, which is employed as an agent for dissolving them. These ingredients are then mingled by agitation until the glue and gelatin are dissolved. Then the fluid thus produced is heated to nearly a boiling-point.

Having compounded a fluid in the manner described above, the white shellac, gum-mastic, gum-benzoin, and stick lac are dissolved in one quart of alcohol, (ninety-five per cent,) and the fluid thus formed is added to the former fluid and thoroughly commingled therewith by stirring. The arsenic is then added to the substance and the whole mass is allowed to stand for half an hour. Then it is strained through a fine cloth. The strained product is now allowed to cool off and stand in a cold place for twenty-four hours and become coagulated. During the cooling process a thin skin will have formed on the top of the mass. This is peeled off and rejected. The mass is then removed from the vessel, cut into small particles, and placed on a slab of marble or stone, where it is allowed to remain for about three days, or until all the water is drained off. It is then spread on a wooden surface in a cool room and allowed to remain for about four days, and after which it is placed in the open air and allowed to remain until all moisture is evaporated and it is perfectly dry. The dried particles produced as above described are now ground into a fine powder, making a product ready for marketing. This powder can be boxed up and kept in an efficient state for any length of time.

To use the composition as a means for coating gilded surfaces, I mix an ounce and a half of the powder with a pint of warm water and apply the mixture with a brush over the gilded parts where a dull finish is desirable.

Having thus described my invention, what I claim as new, and desire to secure by Letters Patent, is—

1. The herein-described composition of matter for coating gilded surfaces, consisting of the following ingredients, viz: white glue, gelatin, white shellac, gum-mastic, gum-benzoin, stick lac, and white arsenic; substantially as described.

2. The herein-described composition of matter for coating gilded surfaces, consisting of the following ingredients, in the following relative proportions, viz: of white glue, five ounces; gelatin, one and one-half ounces; white shellac, four and one-half ounces; gum-mastic, one-half ounce; gum-benzoin, one-half ounce; stick lac, forty grains; and white arsenic, fifteen grains.

In testimony that I claim the foregoing as my invention I have signed my name, in presence of two witnesses, this 13th day of April, 1906.

JAMES A. HENRY.

Witnesses:
E. C. SEATON,
M. E. SHIPLEY.